Patented Nov. 6, 1928.

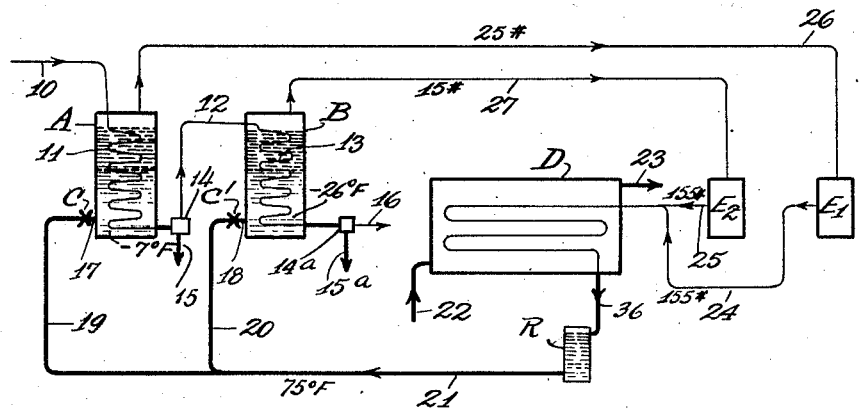
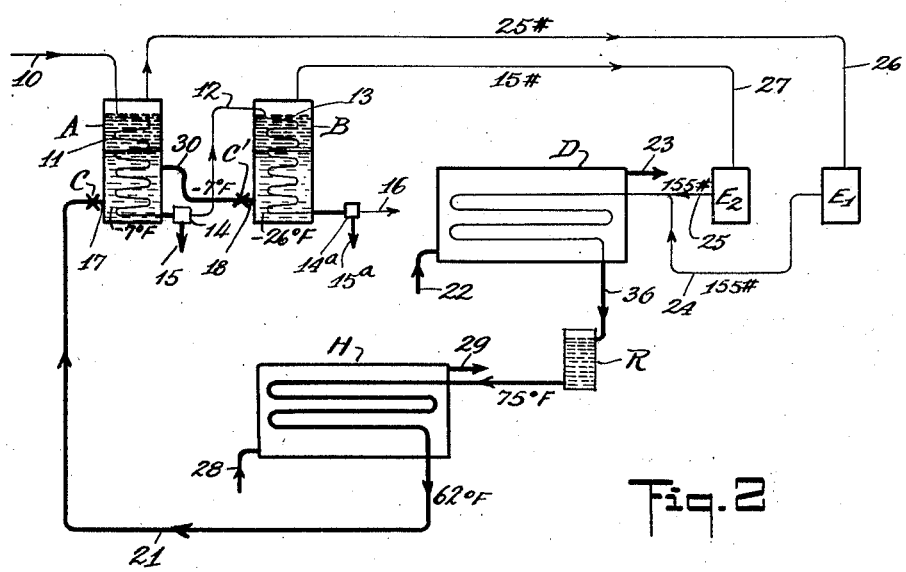

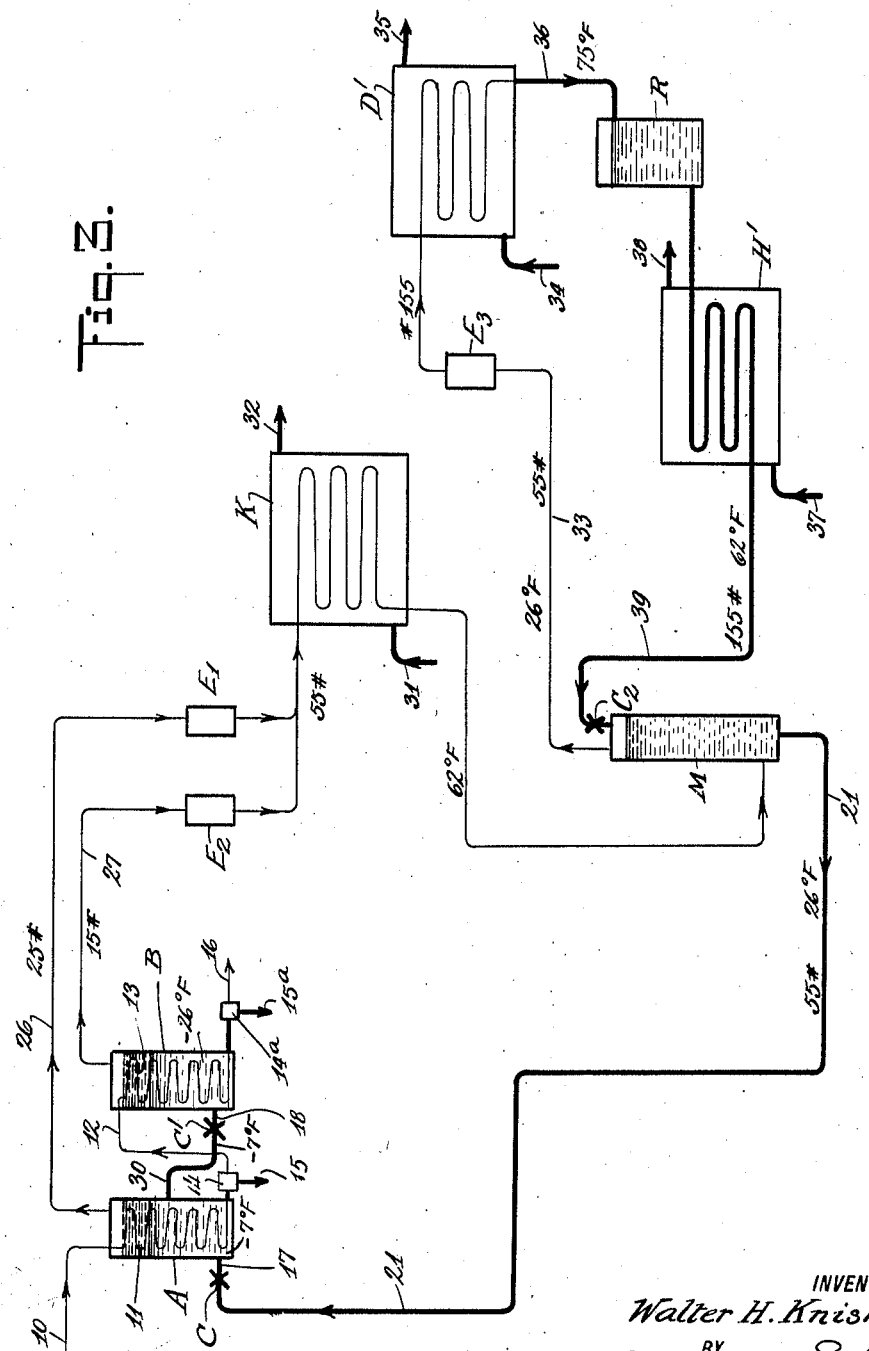

1,690,585

UNITED STATES PATENT OFFICE.

WALTER H. KNISKERN, OF SYRACUSE, NEW YORK, ASSIGNOR TO ATMOSPHERIC NITROGEN CORPORATION, OF SOLVAY, NEW YORK, A CORPORATION OF NEW YORK.

PROCESS FOR TREATING GASES BEARING GASEOUS SYNTHETIC AMMONIA.

Application filed August 16, 1923. Serial No. 657,677.

My invention relates to the art of treating gases from the converter of a synthetic ammonia plant and deals with that phase of the process wherein the relatively dilute synthetic ammonia gas is treated for the extraction therefrom of the ammonia product in liquefied form. The object of my present invention is to secure the desired effect in a more efficient and economical manner than has been heretofore suggested with reference to the obtaining of liquid ammonia from such gas mixture. Other advantages will appear more fully from the detailed description following hereinafter.

Three different forms of apparatus suitable for carrying out my new process are illustrated diagrammatically by Fig. 1, 2 and 3 of the accompanying drawings.

In Fig. 1, A and B are two liquefiers of any well-known or approved detail construction, being shown as vessels closed to the surounding air. At 10 I have indicated a pipe for conveying to the first liquefier, A, the gaseous mixture containing the synthetic ammonia, that is to say, a mixture of nitrogen, hydrogen and ammonia ($NH_3$) the former two predominating. As a rule this gas mixture is under considerable pressure. This mixture passes to a coil 11 located in the liquefier A and the non-liquefied parts thereof (condensed liquids being separated at 14 and withdrawn at 15) then pass through a pipe 12 to a similar coil 13 located in the second liquefier B, the flow of gas being preferably downward in both coils. From the outlet of coil 13 the product (liquefied ammonia together with gaseous nitrogen and hydrogen and $NH_3$) passes to a box or separator $14_a$ having an outlet $15_a$ for the discharge of the liquefied ammonia (final product) and another outlet 16 for leading the unliquefied residual gases (now chiefly N and H) to a different part of the synthetic plant. The liquefied products withdrawn at 15 and $15_a$ constitute the final product of the synthetic ammonia process. The cooling agent (liquid ammonia to be boiled or evaporated, as explained below) is admitted to the lower portions of the liquefiers A and B through inlets 17 and 18, respectively, controlled by expansion valves C, C', respectively, which are set to admit ammonia in sufficient quantity to maintain the desired levels in A and B. The liquid ammonia is supplied to the expansion valves C and C', through branches 19 and 20, receiving liquid ammonia through a pipe 21, from receiver R. In this receiver the condensates of a condenser coil D are collected. The coil D may be cooled by water admitted at 22 and discharged at 23. The inlet (upper end) of the condenser coil receives compressed gaseous ammonia, through pipes 24 and 25, respectively, from the outlets of two compressors E' and $E^2$, respectively. The inlets of these compressors are connected by pipes 26 and 27 respectively, with the upper portions of the liquefiers A and B, respectively. The two compressors may, of course, be replaced by a single compressor of known type, arranged to admit into the cylinder gas from differential pressure lines and to compress the gas admitted from both lines by a single compression stroke of the piston.

The following example will illustrate the operation of my invention: The synthetic gas (consisting of a mixture of synthetic amomnia, $NH_3$, with uncombined nitrogen and hydrogen) in its passage through the coil 11 of the first liquefier, A, is cooled to a temperature of say $-7°$ F., which is a temperature above the temperature selected for final liquefaction, the latter being, for instance, $-26°$ F. In order to produce a temperature of $-7°$ F. in the liquid contained in liquefier A, an ammonia pressure of 25 lbs. per square inch absolute is maintained in said liquefier, by the compressor E', withdrawing ammonia gases or vapors from the top of the liquefier A through the pipe 26, while the expansion valve C is adjusted to deliver liquid ammonia through the inlet 17 into the lower portion of the liquefier A in quantity equivalent to that withdrawn, whereby the liquid ammonia level in A is maintained constant. The ammonia evaporates (boils) and produces the desired cooling effect. Before it reaches the expansion valve C, the liquid ammonia is under a much higher pressure, for instance 155 lbs. absolute, and the temperature of such liquid ammonia (in pipes 19, 20 and 21) may be, for instance, 75° F.

The cooled gas mixture passes from the coil 11 through the pipe 12 to the coil 13 contained in the second liquefier B, and in the latter a much lower temperature (in this case the final liquefaction temperature) is produced by the evaporation (boiling) of liquid ammonia admitted from the expansion valve C' through the inlet 18. For instance, the temperature of the liquid contained in liquefier B may be −26° F. To produce this temperature the liquid ammonia coming from pipes 20 and 21 must be boiled or evaporated in the second liquefier B at a lower pressure than in the liquefier A, for instance, at an ammonia pressure of 15 lbs. absolute when the refrigeration temperature is to be −26° F. In order to produce this pressure the compressor $E^2$ is operated so as to maintain said pressure of 15 lbs. on the suction side (pipe 27) and therefore in the liquefier B.

The successive cooling effect of the liquefiers A and B causes the synthetic ammonia flowing through the coils 11 and 13 to become liquefied, and the liquid product may be withdrawn through the outlets 15 and $15^a$, while the mixture of unliquefied gases (nitrogen and hydrogen) escapes through the outlet 16.

The compressors E' and $E^2$ compress the ammonia vapor received from the liquefiers A and B through the pipes 26 and 27 respectively, to the required pressure, preferably one which allows of subsequent liquefaction on being merely water cooled, for instance 155 lbs. absolute, as mentioned above. The ammonia gases become heated during this compression process, and are then water cooled so as to condense them to liquid form. Thus the gases from the compressor outlets pass through the pipes 24 and 25 to the condenser coil D, in which they will be cooled and condensed to liquid form, the liquid ammonia, under said pressure of 155 lbs. absolute and at a temperature of say 75° F., passing to the liquefiers A and B as set forth above.

It will be noted that the liquefaction of the synthetic ammonia is performed in a plurality of stages, and in the particular example in two stages, the cooling ammonia being arranged to boil at successively lower temperatures in the said liquefiers, such successive lowering of the temperature being accomplished by a successive lowering of the pressure in the respective liquefiers. This step by step refrigeration presents marked advantages over the practice employed hitherto in this art of at once cooling the gas to be liquefied, to the final liquefaction temperature (−26° F. in the example assumed). The advantage of this cooling in stages is quite marked, and is due in part to the fact that the same refrigerating or cooling effect is obtained with the expenditure of less power (in compressors) or that for the same power consumption the cooling effect and therefore the degree of ammonia removal from the synthetic gas, can be increased. The effect may be explained as follows:

The refrigerating effect in the liquefier is measured by the difference in heat content between the incoming (liquid) ammonia and the outgoing (gaseous) ammonia of the refrigerating system. As is well known, the ammonia in its change from the liquid to the gaseous condition absorbs heat from the gaseous mixture passing through the coils 11 and 13. The temperature of −7° F. prevailing in the liquefier A, or any other temperature which is intermediate between the admission temperature (75° F. in the example given), and the final temperature (−26° F. in the example given) being higher than the final temperature of say −26°, F., it follows that the heat content of the ammonia gas at the intermediate temperature (say −7° F.) must be greater than the heat content of the same amount of gas at the lower temperature of −26° F. Therefore the refrigerating effect resulting from the evaporation or boiling of the same amount of liquid ammonia, is greater at −7° F. or other intermediate temperature than at −26° F. In other words, to cool a given amount of synthetic gas to the desired final temperature (say −26° F.) requires the evaporation of a smaller amount of ammonia and consequently the re-compression of a smaller amount of ammonia, if the gas is cooled first to −7° F. or other intermediate temperature and then to −26° F. or other final temperature, than if the gas is cooled at once to the desired temperature. It will, of course, be understood that the number of successive stages may be greater than two, and theoretically the advantage just explained is greater with an increase in the number of successive steps or stages. However, on account of the increased cost of apparatus and other considerations, largely of a mechanical character, there will be a practical limit to the number of cooling steps which it is advisable to use in practice. One of the main reasons, however, why the cooling in steps or stages is of advantage is resultant economy in the power of compression. It will be observed that if the temperature in a liquefier is relatively high, the pressure of the evaporated ammonia or ammonia vapor from that liquefier is correspondingly high. Thus, if the temperature in the first liquefier is −7° F., the ammonia pressure is 25 lbs. absolute instead of 15 lbs. as it is in the final stage where the temperature is −26° F. It requires less power to re-compress the same amount of ammonia gas from 25 lbs. to 155 lbs. than from 15 lbs. to 155 lbs. and herein lies the main economy effected by my step process.

Hence not only is there no decrease, and, in fact, an increase in the refrigerating effect of a given quantity of liquid ammonia when a part of it is evaporated at a higher pressure, but the power required to re-condense the evaporated and gaseous ammonia is less.

A further advantage due to the process will be found in the ability to remove the product at the end of each refrigerating stage without requiring further refrigeration to be wastefully expended on the product already in a withdrawable condition.

Of course, it will be understood that while I have referred to the use of ammonia as a refrigerating agent I do not wish to restrict myself thereto, but other vaporizable agents might be substituted for the ammonia.

In the form of my invention illustrated by Fig. 2, the construction differs in two respects from the one shown in Fig. 1.

First, after condensation at a temperature of say 75° F. in the condenser D, the liquid ammonia is not conveyed at that temperature to the two liquefiers but is first passed through a cooler H which may receive cooling water at 28 while the warm water is discharged at 29. By this device the liquid ammonia may be cooled from 75° F. to say 62° F.

Second, in Fig. 1 the connections 19 and 20 supplying liquid ammonia to the liquefiers A and B respectively are connected in parallel. In Fig. 2, however, the pipe 21 is connected directly only with the expansion valve C located at the liquefier A and a separate pipe 30 leads from said liquefier at a suitable level to the expansion valve C' admitting the ammonia to the inlet 18 of the liquefier B.

The construction shown in Fig. 2 has the same advantages as the one first described and the following additional advantages:

First, lowering the temperature of the liquid ammonia entering the liquefier A will decrease its initial heat content and therefore increase its refrigerating effect, conditions as to temperature and therefore the heat content of the exit vapor being assumed to be the same as those described with reference to Fig. 1. This decreased temperature (from 75° F. to about 62°) is obtained by the water cooler H. The power for pumping and cost of this additional cooling water is more than offset by the resultant increased refrigerating effect in A.

Second, in cooling the synthetic gas to any given temperature in one of the liquefiers, the refrigerating ammonia of that liquefier must also be cooled to the same temperature e. g. in Fig. 1 the ammonia of liquefier A is cooled from 75° F. to −7° F. and of B from 75° F. to −26° F. This "self cooling" is effected by and at the expense of the evaporation of part of the liquid ammonia of that liquefier. The general principle explained above in connection with cooling the synthetic gas in steps, also applies to such "self cooling", i. e. it is more economical to cool the refrigerating ammonia of B in steps to −26° F. than all at once. This is done in Fig. 2 by cooling it to −7° F. in A and then from −7° to −26° F. in B.

A further development of this invention is illustrated by Fig. 3. The connections of the two liquefiers A, B, with each other, with the pipe 21, and with the compressors E', E², are the same as in Fig. 2. The compressors E', E², however, are less powerful in this case than those of Fig. 2, that is to say, they do not re-compress the gaseous ammonia to the final pressure of say 155 lbs. but to an intermediate pressure of say 55 lbs. The gas leaving the compressors E', E², of this first stage is preferably cooled, say to about 62° F, by passing it through a coil K which may be cooled by water admitted at 31 and escaping at 32. The gas then passes into a cooler M and then through a pipe 33 to the second stage compressor or second stage cylinder E³. In said pipe 33 the gas may have a temperature of say 26° F., its pressure being, of course, still 55 lbs. The compressor E³ then brings the gaseous ammonia to the desired final pressure of 155 lbs. and the gas at this pressure is passed to the condenser coil D' which may be cooled by water admitted at 34 and escaping at 35. The ammonia gas is thus condensed into liquid form, the liquid having a temperature of, for instance, 75° F. This liquid passes through a pipe 36 into a receiver R and then into a cooling coil H' (cooled by water admitted at 37 and escaping at 38) the temperature of the liquid being thus brought down from 75° F. to say 62° F. At this temperature the liquid ammonia passes through pipe 39 to an expansion valve C² and from thence into the cooler M at a pressure equal to that of the gas leaving the first stage compressors E', E², that is to say, at a pressure of 55 lbs. in the example given. The liquid ammonia leaving the cooler M at the bottom through the pipe 21, therefore has a temperature of say 26° F., corresponding to the pressure 55 lbs. In the cooler M, then the gas going from the first stage compressor E', E² to the second stage compressor E³ is further cooled from say 62° F. to 26° F. which increases the efficiency of the compressor E³; and at the same time the liquid ammonia going to the liquefier A is also further cooled from say 62° F. to 26° F., which cooling, as already explained in connection with Fig. 2, will increase the refrigerating effect in A. This double cooling effect is produced by the evaporation of some of the liquid ammonia introduced through 39 into M. By using the two stage compression of the gaseous ammonia with intermediate cooling of the gas as above described, I am enabled to obtain a still further increased capacity and efficiency of the refrigerating plant.

It will be understood that the synthetic ammonia mixture and the liquid may be propelled through the paths described above by means of pumps, blowers, gravity or any other approved expedients. The remarks made in connection with Fig. 1 as to the possibility of using volatile liquids other than ammonia will apply to Figs. 2 and 3 as well. It will be noted especially that I use the same body of liquid ammonia continuously in the refrigerating circuit and that different portions of such body of ammonia are boiled or evaporated under different pressures to produce the desired progressive refrigeration.

In stating the temperatures of 75° and 62° in the foregoing specification the figures are based on cooling water inlet temperatures of about 60° F.

Various changes in the specific form shown and described may be made within the scope of the claims without departing from the spirit of my invention.

I claim:

1. The process of liquefying synthetic ammonia gas from a gaseous mixture containing it, which consists in subjecting said mixture, in successive stages, to a cooling action obtained by evaporating portions of the same volatile liquid cooling agent at pressures which are progressively lower from one stage to the next, recompressing the resulting vapors of such cooling agent to the same pressure, condensing such compressed vapors to liquid form, and returning such liquid to the evaporating stages.

2. The process of liquefying synthetic ammonia gas from a gaseous mixture containing it, which consists in subjecting said mixture, in successive stages, to a cooling action obtained by evaporating portions of the same volatile liquid cooling agent at pressures which are progressively lower from one stage to the next, compressing the resulting vapors of such cooling agent, condensing such compressed vapors to liquid form, and returning such liquid to the evaporating stages.

3. The process of liquefying synthetic ammonia gas from a gaseous mixture containing it, which consists in subjecting said mixture, in successive stages, to a cooling action obtained by evaporating portions of the same volatile liquid cooling agent at pressures which are progressively lower from one stage to the next, compressing the resulting vapors of such cooling agent, condensing such compressed vapors to liquid form, cooling the liquid, and returning the cooled liquid to the evaporating stages.

4. The process of liquefying synthetic ammonia gas from a gaseous mixture containing it, which consists in subjecting said mixture, in successive stages, to a cooling action obtained by evaporating portions of the same volatile liquid cooling agent at pressures which are progressively lower from one stage to the next, separately compressing to the same pressure, the vapors of the cooling agent resulting in the individual stages, leading together such compressed vapors and condensing them to liquid form, and returning the liquid to the evaporating stages.

5. The process of liquefying synthetic ammonia gas from a gaseous mixture containing it, which consists in subjecting said mixture, in successive stages, to a cooling action obtained by evaporating portions of the same volatile liquid cooling agent at pressures which are progressively lower from one stage to the next, compressing the resulting vapors of such cooling agent, in a plurality of successive compression stages producing different pressures, condensing the compressed vapors to liquid form, and returning the liquid to the evaporating stages.

6. The process of liquefying synthetic ammonia gas from a gaseous mixture containing it, which consists in subjecting said mixture, in successive stages, to a cooling action obtained by evaporating portions of the same volatile liquid cooling agent at pressures which are progressively lower from one stage to the next, compressing the resulting vapors of such cooling agent, in a plurality of successive compression stages producing different pressures, cooling the partly compressed gases between successive compression stages, condensing the compressed vapors to liquid form, and returning such liquid to the evaporating stages.

7. The process of liquefying synthetic ammonia gas from a gaseous mixture containing it, which consists in subjecting said mixture, in successive stages, to a cooling action obtained by evaporating portions of the same volatile liquid cooling agent at pressures which are progressively lower from one stage to the next, compressing the resulting vapors of such cooling agent, in a plurality of successive compression stages producing different pressures, condensing the compressed vapors to liquid form, bringing such liquid, under reduced pressure, into heat-exchange relation with the partly compressed gases between successive compression stages, thereby cooling both the liquid and such gases, and returning the cooled liquid to the evaporating stages.

8. The process of liquefying synthetic ammonia gas from a gaseous mixture containing it, which consists in bringing such mixture into heat-exchange relation with a volatile liquid cooling agent which is boiling and which is under a definite pressure, and subsequently bringing the unevaporated remnant of said liquid, under a reduced pressure and in a boiling condition, into renewed heat-exchange relation with the previously cooled gaseous mixture, thereby cooling such mixture to a lower temperature, recompressing the resulting vapors of such cooling agent and condensing them to liquid form, and returning such liquid to the evaporating stages.

9. The process of liquefying synthetic ammonia gas from a gaseous mixture containing it, which consists in subjecting said mixture, in successive stages, to a cooling action obtained by evaporating portions of the same volatile liquid cooling agent at pressures which are progressively lower from one stage to the next.

10. The process of liquefying synthetic ammonia gas from a gaseous mixture containing it, which consists in bringing such mixture into heat-exchange relation with a volatile liquid cooling agent which is boiling and which is under a definite pressure, and subsequently bringing the unevaporated remnant of said liquid, under a reduced pressure and in a boiling condition, into renewed heat-exchange relation with the previously cooled gaseous mixture, thereby cooling such mixture to a lower temperature.

In testimony whereof I have hereunto set my hand.

WALTER H. KNISKERN.